United States Patent [19]

Roselli

[11] Patent Number: 5,036,468
[45] Date of Patent: Jul. 30, 1991

[54] ARRANGEMENT FOR READING AN ABSOLUTE POSITION ENCODER FOR DETERMINING THE OPERATING POSITION OF A BREAK HANDLE

[75] Inventor: Leonard Roselli, Verona, Pa.

[73] Assignee: Westinghouse Air Brake COmpany, Wilmerding, Pa.

[21] Appl. No.: 516,600

[22] Filed: Apr. 30, 1990

[51] Int. Cl.$^5$ .................. B60T 13/66; B06F 15/20
[52] U.S. Cl. .................. 364/426.05; 364/426.01; 303/20
[58] Field of Search .......... 364/426.05, 426.01, 364/174, 181; 318/568.18, 638; 246/182 A, 189; 303/20

[56] References Cited

U.S. PATENT DOCUMENTS

| | | | |
|---|---|---|---|
| 4,206,620 | 6/1980 | Eaton | 364/476 |
| 4,260,941 | 4/1981 | Engelberger et al. | 318/568.2 |
| 4,344,138 | 8/1982 | Frasier | 364/426.01 |
| 4,488,237 | 12/1984 | Aronson et al. | 364/476 |
| 4,578,754 | 3/1986 | Sahasrabudhe et al. | 364/426.05 |
| 4,631,657 | 12/1986 | Hill et al. | 318/696 |
| 4,692,867 | 9/1987 | Poole | 364/426.01 |

*Primary Examiner*—Thomas G. Black
*Attorney, Agent, or Firm*—J. B. Sotak

[57] ABSTRACT

An apparatus for reading the binary value of a digital absolute position encoder for obtaining an operating position of a brake handle for a railway vehicle including a storage circuit for storing a binary value of an initial offset release position of the encoder. A memory circuit for retaining a binary value of a maximum resolution of the encoder. A first summing circuit for substracting the binary value of the initial offset release position from the binary value of the operating position for obtaining a resultant binary value which is passed to an output summing circuit by an activated enable circuit when the binary value of the operating position is greater than the binary value of the initial offset release position. A second summing circuit for subtracting the binary value of the operating position from the binary value of the maximum resolution for obtaining a difference in binary value which is added tothe binary value of the initial offset release position, a third summing circuit for obtaining a resultant binary value which is passed to the output summing circuit by an activated enable circuit when the binary value of the initial offset release position is greater than the binary value of the operating position.

11 Claims, 1 Drawing Sheet

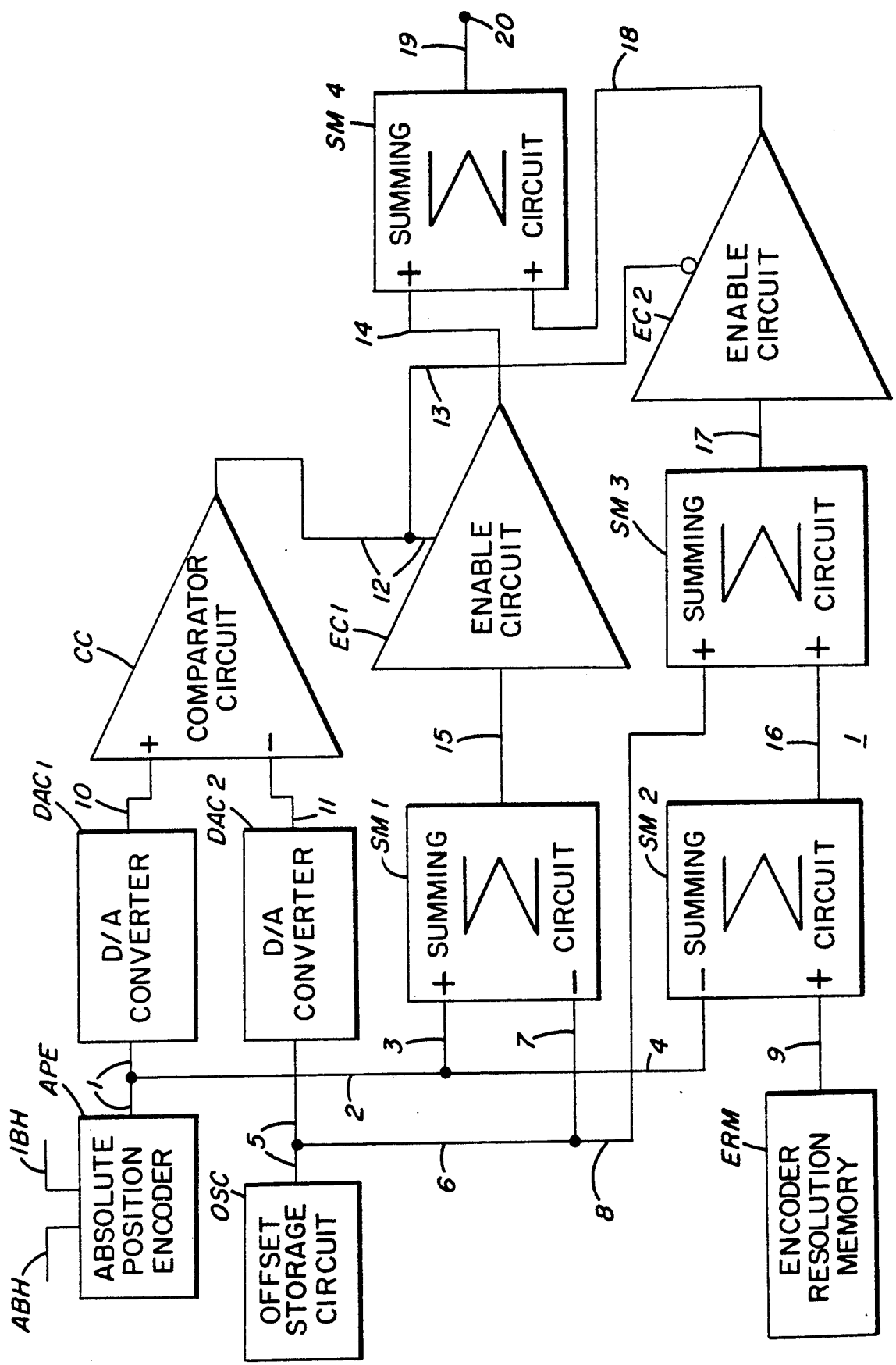

ARRANGEMENT FOR READING AN ABSOLUTE POSITION ENCODER FOR DETERMINING THE OPERATING POSITION OF A BREAK HANDLE

FIELD OF THE INVENTION

This invention relates to a method of reading an absolute position encoder and, more particularly, to an arrangement for ascertaining the actual braking position of a brake handle of a cab control unit on a lead locomotive of a train by reading the present binary value of an absolute optical encoder which is used to obtain a corrected binary value by subtracting a previous offset binary value from the present binary value.

BACKGROUND OF THE INVENTION

In railroad and mass and/or rapid transit railway operations, the brake action of a train is controlled by the road power operator or engineer in the cab of the lead unit or locomotive. In the past, the operator manipulated a brake valve handle located in the cab. The brake valve device either is mounted on a traditional 26-style control stand or is designed for use with the conventional well-known 30 desk style console, with each style employing two brake handles for controlling the brakes on both the locomotive and cars of the train.

The automatic or train control is accomplished by rotational movement of a first brake handle through approximately the same angle of rotation on either the 26 or 30 style brake valve equipment. The angular rotation of the automatic brake handle from a release or running position to a minimum service brake position creates a step function resulting in a pressure change in the brake pipe consistent with a minimum brake pipe reduction. The degree of handle movement through the service zone will determine the amount of equalizing reservoir air pressure reduction that will be obtained. After the reduction of brake pipe air pressure is completed throughout the train consist, the relay valve will lap and will maintain the pressure in the brake cylinders in the amount developed during the reduction, provided that the brake pipe leakage is within prescribed acceptable limits. Further rotation of the automatic brake through the braking range provides a complete variable control of the brake pipe pressure up to the full service brake position. If the rotation of the automatic brake handle is continued through the full service position, it will move to a suppression position, then to an over-reduction zone, and finally, to an emergency position. A positive mechanical detent is provided for each position to assist the engineman, by giving him a sense of feel for the distinct braking positions.

The control of the locomotive or independent brake is accomplished by rotational movement of a second brake handle. The independent brake handle provides the means for controlling the locomotive brake cylinder pressure, regardless of the automatic brake handle position or state of the automatic brake on the train. To direct air into the brake cylinders, the independent brake handle is manually into an application zone. The rotation of the independent brake handle provides a complete variable control from a release position to a full independent application position.

In practice, the cab control unit is arranged and designed to be a man-to-machine interface, and is strictly an electrical/electronic device which has no pneumatic connections. An associated microcomputer contains the intelligence to issue and interpret the brake commands initiated from the cab control unit to the pneumatic control unit. As noted above, the brake commands emanating from the cab control unit are dependent upon the given position of the automatic and/or indepedent brake handles. In actual practice, the angular positions of the brake handles are sensed and monitored by rotary absolute encoders, which are mechanically coupled to associated rotary shafter. In order to accurately detect the discrete angular brake handle positions, it is necessary to establish a base or zero position for both brake handles. In the past, it was common practice to mechanically set or establish the zero position during the assembly and installation of the equipment. It will be appreciated that this type of mechanical initialization or setup of each of the encoders is both expensive and time-consuming. In addition, a railroad enviroment is susceptible to a wide variation of temperatures and is exposed to extreme vibrations and agitations which can adversely affect the initial zero position setting so that a periodic readjustment is necessary to maintain a true zero position. A method and arrangement of overcoming the previous zero position setting is shown and described in may. copending patent application, Ser. No. 516,603, entitled "Arrangement for Dynamic Calibrating an Absolute Position Encoder", filed concurrently herewith. The above application discloses an arrangement for establishing an initial zero position or offset reading of an absolute position encoder by ascertaining that the brake handle of a cab control unit is in a release or non-braking position and for storing the initial reading in permanent memory for subsequent use in calculating a given braking position to effectively control the air brake operation on a railway vehicle.

OBJECTS AND SUMMARY OF THE INVENTION

Accordingly, it is an object of this invention to provide a unique arrangement for reading an absolute position encoder for determining the operating position of a brake handle.

Another object of this invention is to provide a novel system for reading an absolute optical encoder for ascertaining the brake command position of a rotary handle on a railway vehicle.

A further object of this invention is to provide a new method of calculating the actual position of an absolute position encoder for determining the present position of a brake handle.

Yet another object of this invention is to provide an improved arrangement for determining the present position of a brake handle by resolving the existing reading of an absolute position encoder from a zero reading.

Yet a further object of this invention is to provide a system for differentiating the present reading of an absolute position encoder from a zero reading to obtaining the actual position of a brake handle.

Yet a further object of this invention is to provide an improved brake selection arrangement comprising, handle means for controlling the braking of a railway vehicle, encoder means for monitoring the selected brake position of said handle means, offset means for storing an initial brake release position, summing means for ascertaining the difference between the selected brake position and the initial brake release position, means for comparing the selected brake position and the initial brake release position for activating an enable means to permit the passage of the difference when the selected brake position is greater than the initial brake release position, and output means for producing a binary signal signifying the actual brake position.

Still another object of this invention is to provide a new and unique circuit arrangement for determining the position of a brake handle or a railway vehicle comprising, encoder means for producing a binary number representative of the selected braking position, storage means for storing a binary number representative of an initial offset of said encoder position, memory means for storing a binary number representative of a maximum resolution, first encoder summing means for subtracting the binary number of the initial offset position from the binary number of the selected braking position, a second summing means for subtracting the binary number of the selected braking position from the binary number of the maximum resolution of the encoder, a third summing means for adding the resultant of the binary number of the maximum resolution of the encoder minus the binary number of the selected braking position to the binary number of the initial offset position, a first converter means for converting the binary number of the selected braking position to a first corresponding signal, a second converter means for converting the binary number of the initial offset position to a second corresponding signal, a comparator means for comparing said first corresponding signal to a second corresponding signal and for producing a first logical output when the first corresponding signal is greater than the second corresponding signal and for producing a second logical output when the second corresponding signal is greater than the first corresponding signal, a first enable circuit means activated by the first logical output and deactivated by the second logical output, a second enable circuit means deactivated by the first logical output and activated by the second logical output, and a fourth summing means for processing the binary output of the first summing means when the first enable circuit means is activated to provide an indication of the brake handle position and for processing the binary output of the third summing means when the second enable circuit means is activated to provide an indication of the brake handle position.

Still a further object of the invention is to provide an arrangement for monitoring a digital absolute position encoder for ascertaining the position of a brake handle which is economical in cost, unique in design, efficient in operation, dependable in service, durable in use, and simple in construction.

DESCRIPTION OF THE DRAWINGS

The above objects and other attendant features and advantages will be more readily appreciated as the present invention becomes better understood by reference to the following detailed description when considered in conjunction with the accompanying drawing, wherein:

The single FIGURE is a schematic circuit block diagram of an arrangement for reading the position of an absolute position encoder which is representative of the selected braking position of a brake handle in accordance with the present invention.

DETAILED DESCRIPTION OF THE INVENTION

Referring now to the single FIGURE of the drawing, there is shown a system generally characterized by numeral 1, for determining the braking position of a brake handle of a railway vehicle. In a railroad and mass and/or rapid train milieu, the engineer or operator normally controls the braking from the cab of the lead or foremost locomotive. In practice, the cab includes a control station having a cab control unit which has a pair of manually rotatable or movable brake handles. There is shown a first automatic brake handle or lever ABH for controlling the brakes of the entire consist of the train and a second independent brake handle or lever IBH for controlling the brake cylinder pressure on the locomotive. Each brake handle is mechanically coupled to the rotary shafts of separate position encoders. Each of the encoders may take the form of an absolute position encoder APE, which is disclosed in the above-mentioned U.S. patent application, Ser. No. 516,603. As shown in FIG. 2 of U.S. patent application Ser. No. 516,603, the encoder APE produces binary output data, which is a product of a plurality of light-emitting diodes and a plurality of photoresponsive transistors. The diodes direct beams of light onto ten (10) tracks of an etched metal disk. Each track is arranged to cooperate with one of the array of light-emitting diodes and an associated phototransistor. It will be appreciated that as an opening passes a respective light-emitting diode, the traversing light will activate a corresponding photoresponsive transistor. Thus, the presence of a slot will cause a high or logical "1" output, while the absence of a slot will cause a low or logical "0" output. Each state will be assigned a number by the decoding electronics which, when combined, will correspond to a ten (10) bit binary number. Thus, with ten (10) bits, the resolution will be 1024 discrete positions.

As shown, the binary output from the absolute position encoder APE is conveyed to the input of a first digital-to-analog (D/A) converter DAC1 via lead 1. The output data of encoder APE is also conveyed to the positive (+) input of a first summing circuit SM1 via lead 1, 2 and 3, and to the negative (−) input of a second summing circuit SM2 via leads 1, 2 and 4.

As noted in U.S. patent application, Ser. No. 516,603, each of the encoders is initially calibrated to determine a reference level, or zero position, when the brake handle is in a release position, and then the binary data is placed in memory for later use in calculating the selected brake positions to which the engineer or trainman moves the respective brake handles during train movement. In this case, the binary reference level is stored in the offset storage register or memory circuit OSC, which is a non-volitile storage medium, such as, either a battery-backed Randon Access Memory (RAM) or an Electrically Erasable Programmable Read Only Memory (EEPROM). As shown, the ten (10) bit binary output of the offset storage circuit is conveyed to the input of a second digital-to-analog (D/A) converter DAC2 via lead 5. In addition, the output of the offset storage circuit OSC is also connected to the negative (−) input of the first summing circuit SM1 via leads 5, 6 and 7, and to a first positive (+) input of a third summing circuit SM3 via leads 5, 6 and 8.

As previously mentioned, with 1024 positions per revolution, the maximum encoder numeral value is 1023, which is equivalent to a binary value of 1111111110. As shown, the stored output of Encoder Resolution Memory Circuit ERM is conveyed to the positive (+) input of the second summing circuit SM02 via lead 9.

It will be noted that the analog output of the first D/A converter DAC1 is connected to the positive (+) input of a comparator circuit CC, via lead 10, while the analog output of the second D/A converter DAC2 is connected to the negative (−) input of the comparator circuit CC, via lead 11. As shown, the output of the comparator circuit CC is connected to the input of a first enable circuit EC1 via lead 12 and to the inverted input of a second enable circuit EC2 via leads 12 and 13. It will be appreciated that the comparator circuit CC produces a high or logical "1" when the analog input conveyed by lead 10 to the positive (+) terminal is greater than the analog input conveyed to the negative (−) terminal. Conversely, the comparator circuit CC produces a low or logical "0" when the analog input on the negative (−) terminal is greater than the analog input on the positive (+) terminal. It will be understood that the logical "1" output activates the enable circuit EC1 and deactivates the enable circuit EC2, while a logical "0" output deactivates the enable circuit EC1 and activates the enable circuit EC2. It will be seen that the output of the first enable circuit EC1 is connected to a first positive (+) input of a fourth summing circuit via lead 14. As shown, the output of the second summing circuit SM2 is connected to the input of the first enable circuit EC1 via lead 15.

It will be noted that the output of the second summing circuit SM2 is connected to a second positive (+) input of the third summing circuit SM3 via lead 16. The output of the third summing circuit SM3 is connected by lead 17 to the input of the second enable circuit EC2, while the output of the second enable circuit EC2 is connected to a second positive (+) input of the fourth summing circuit SM4 via lead 18. As shown, the normalized encoder output signal value of the fourth summing circuit is connected to output terminal 20 via lead 19.

Let us now assume that an initial calibration of the absolute position encoder APE taken place, and that zero position data is stored in the offset storage circuit OSC, which is supplied by lead 5 to the input of the second D/A converter DAC2 and to the negative (−) input of the first summing circuit SM1 by leads 5, 6 and 7 as well as to the first positive (+) input of the third summing circuit SM3 by leads 5, 6 and 8. Further, let us assume that the head end engineer moves the independent brake handle IBH from its release position to a select application position to initiate braking on the locomotive. The rotational movement causes a corresponding movement of the encoder disk, which results in a new ten (10) bit binary code to be produced by the absolute position encoder APE. This brake application position data is supplied by lead 1 to the input of the first D/A converter DAC1 and to the positive (+) input of the first summing circuit SM1 via leads 1, 2 and 3 as well as to the negative (−) input of the second summing circuit SM2 via lead 1, 2 and 4. The D/A converters DAC1 and DAC2 convert the digital data received from the encoder APE and the storage circuit OSC, respectively, into corresponding analog signals. For the purpose of discussion, let us assume that the amplitude of the signal on the positive (+) input of the comparator CC is greater than the amplitude of the signal on the negative (−) input of comparator CC. Under this condition, the comparator CC outputs a logical "1", which activates the first enable circuit EC1 and deactivates the second enable circuit EC2. The enablement of the enable circuit EC1 allows the passage of the information output data appearing on lead 15 from the first summing circuit SM1. In the present instance, the output of the summing circuit SM1 is the summation of the present brake application encoder reading minus the previous offset encoder reading. The binary output data appearing on lead 15 is passed by the first enable circuit EC1 and is conveyed to the first positive (+) input of the fourth summing circuit SM4. It will be appreciated that the input appearing on the second positive (+) input of the fourth summing circuit SM4 is effectively zero, since the second enable circuit EC2 is deactivated by the high or logical "1" supplied by comparator circuit CC via leads 12 and 13. Thus, the ten (10) bit output on lead 19 and, in turn, on terminal 20, is the raw reading of the absolute position encoder APE minus the stored reading of the offset storage circuit OSC, namely, raw encoder reading minus offset reading. The resultant binary number on output terminal 20 is representative of the normalized value of the desired braking position that has been selected by the engineer.

Let us now assume that the stored binary value of the offset storage circuit OSC is greater than the raw binary value of the absolute position encoder APE, which is representative of the presently selected position of the independent brake handle IBH. Under this condition, the corresponding analog signal appearing on lead 11 and supplied to the negative (−) input of the comparator circuit is greater than the analog signal appearing on the positive (+) terminal, so that the comparator CC outputs a low or logical "0", which deactivates the first enable circuit EC1 and activates the second enable circuit EC2. As previously mentioned, the ten (10) bit binary number of encoder APE is fed to the negative (−) input of the second summing circuit SM2 via leads 1, 2 and 4 while, at the same time, the ten (10) bit highest resolution binary number is fed to the positive (+) input of the second summing circuit SM2 via lead 9. Thus, the output appearing on lead 16 is the summation of the highest resolution reading minus the present brake application encoder reading, which is fed to the second positive (+) input of the third summing circuit SM3. The first positive (+) input of the third summing circuit SM3 is provided with the previous offset encoder reading by leads 2, 6 and 8. Thus, the output developed on lead 17 is the summation of the highest resolution reading minus the present braking application reading plus the previous offset encoder reading, which is passed by the activated enable circuit EC2 and is fed to the second positive (+) input of the fourth summing circuit SM4 via lead 18. Thus, the ten (10) bit binary number appearing on terminal 20 is the normalized value representative of the actual selected brake handle position which is utilized to control the desired brake cylinder pressure on the locomotive.

It will be appreciated that the reading or deciphering of the absolute optical encoder for the automatic brake handle ABH is substantially the same, but requires the automatic brake handle to be initially placed in the release position to obtain an offset reading which may be used for subsequently establishing the braking position of its associated encoder.

Thus, the present invention has been described in such full, clear, concise and exact terms as to enable any person skilled in the art to which it pertains to make and use the same, and having set forth the best mode contemplated of carrying out may invention. Further, I state that the subject matter which I regard as being my invention is particularly pointed out and distinctly set forth in what is claimed.

It wil be understood that various alterations and changes may be made by those skilled in the art without departing from the spirit and scope of the subject invention. Further, with the advent of microprocessors and minicomputers, it is evident that the various functions and operations may be carried out and processed by a suitably programmed computer which receives the different inputs and produces the appropriate outputs. Therefore, it will be appreciated that certain modifications, ramifications, and equivalents will be readily apparent to persons skilled in the art and, accordingly, it is understood that the present invention should not be limited to the exact embodiment shown and described, but should be accorded the full scope ands protection of the appended claims.

I claim:

1. A brake selection apparatus comprising, handle means for controlling the braking of a railway vehicle, brake encoder means for monitoring the selected position of said handle means, offset means for storing an initial brake release position, a summing means for acertaining the difference between the selected brake position and the initial brake release position, means for comparing the selected brake position and the initial brake release position for activating an enable means to permit passage of the difference when the selected brake position is greater than the initial brake release position, and output means for producing a binary signal signifying the actual brake position.

2. The brake selection apparatus, as defined in claim 1, wherein said brake means is a digital-type of absolute position encoder.

3. The brake selection apparatus, as defined in claim 1, wherein said handle means is a rotatable lever.

4. The brake selection apparatus, as defined in claim 1, wherein a resolution memory means stores the maximum number of discrete positions of said encoder means.

5. The brake selection apparatus, as defined in claim 4, wherein another summing means ascertains the difference between the maximum number of discrete positions and the selected brake position.

6. The brake selection apparatus, as defined in claim 5, wherein further summing means adds the initial brake position to the difference of the maximum number of discrete positions and the selected brake position.

7. The brake selection apparatus, as defined in claim 6, wherein said comparing means activates another enable means for permitting the passage of the sum of the initial brake release position to the difference of the maximum number of discrete positions and the selected brake position when the initial brake release position is greater than the selected brake position.

8. The brake selection apparatus, as defined in claim 7, wherein the output means produces a binary signal signifying the sum of the initial brake release position to the difference of the maximum number of discrete positions and the selected brake position.

9. The brake selection apparatus, as defined in claim 1, wherein a first digital-to-analog converter converts a binary output of the encoder means to a voltage signal which is fed to one input of the comparing means.

10. The brake selection apparatus, as defined in claim 9, wherein a second digital-to-analog converter converts a binary output of the storing means to a voltage signal which is fed to another input of the comparing means.

11. An apparatus for determining the position of a brake handle on a railway vehicle comprising, encoder means for producing a binary number representative of the selected braking position, storage means for storing a binary number representative of an initial offset position of said encoder means, memory means for storing a binary number representative of a maximum resolution of said encoder, means, a first summing means for subtracting the binary number of the initial offset position from the binary number of the selected braking position, a second summing means for subtracting the binary number of the selected braking position from the binary number of the maximum resolution of the encoder means, a third summing means for adding the resultant of the binary number of the maximum resolution of the encoder means minus the binary number of the selected braking position to the binary number of the initial offset position, a first converter means for converting the binary number of the selected braking position to a first corresponding signal, a second converter means for converting the binary number of the initial offset position to a second corresponding signal, a comparator means for comparing said first corresponding signal to said second corresponding signal and for producing a first logical output when the first corresponding signal is greater than the second corresponding signal and for producing a second logical output when the second corresponding signal is greater that the first corresponding signal, a first enable circuit means activated by the first logical output and deactivated by the second logical output, a second enable circuit means deactivated by the first logical output and activated by the second logical output, and a fourth summing means for processing the binary output of the first summing means when the first enable circuit means is activated to provide an indication of the brake handle position and for processing the binary output of the third summing means when the second enable circuit means is activated to provide an indication of the brake handle position.

* * * * *

UNITED STATES PATENT AND TRADEMARK OFFICE
CERTIFICATE OF CORRECTION

PATENT NO. : 5,036,468
DATED : July 30, 1991
INVENTOR(S) : Leonard Roselli

It is certified that error appears in the above-identified patent and that said Letters Patent is hereby corrected as shown below:

Column 7, line 33, after "brake" insert --encoder-- line 46, after "wherein" insert --a--

Signed and Sealed this

Fifth Day of October, 1993

Attest:

BRUCE LEHMAN

Attesting Officer

Commissioner of Patents and Trademarks